United States Patent
Advocate et al.

(10) Patent No.: US 7,715,059 B2
(45) Date of Patent: May 11, 2010

(54) FACSIMILE SYSTEM, METHOD AND PROGRAM PRODUCT WITH JUNK FAX DISPOSAL

(75) Inventors: William H. Advocate, Staatsburg, NY (US); Donald J. Samuels, Silverthorne, CO (US)

(73) Assignee: International Business Machines Corporation, Armonk, NY (US)

( * ) Notice: Subject to any disclaimer, the term of this patent is extended or adjusted under 35 U.S.C. 154(b) by 1964 days.

(21) Appl. No.: 10/690,759

(22) Filed: Oct. 22, 2003

(65) Prior Publication Data

US 2005/0088702 A1       Apr. 28, 2005

(51) Int. Cl.
- H04N 1/00  (2006.01)
- H04N 1/40  (2006.01)
- H04N 1/387  (2006.01)
- G06F 3/12  (2006.01)
- G06F 15/16  (2006.01)
- G06K 9/20  (2006.01)

(52) U.S. Cl. ............ 358/405; 358/1.15; 358/448; 358/453; 358/462; 358/465; 709/206; 709/207; 382/283

(58) Field of Classification Search ........... 358/1.15, 358/400, 402, 403, 405, 406, 440, 444, 453, 358/462, 468, 470, 448, 465, 1.14; 345/166, 345/167; 379/100.01, 100.15, 93.24; 713/206, 713/207, 201; 347/1; 709/206, 207; 382/283
See application file for complete search history.

(56) References Cited

U.S. PATENT DOCUMENTS

| | | | | |
|---|---|---|---|---|
| 5,293,253 A * | 3/1994 | Kida et al. | ............ | 358/440 |
| 5,307,178 A * | 4/1994 | Yoneda | ............ | 358/440 |
| 5,448,376 A * | 9/1995 | Ohta | ............ | 358/448 |
| 5,613,012 A * | 3/1997 | Hoffman et al. | ............ | 382/115 |
| 5,668,897 A * | 9/1997 | Stolfo | ............ | 382/283 |
| 5,724,408 A * | 3/1998 | Morganstein | ............ | 379/88.2 |
| 5,745,257 A | 4/1998 | Kato et al. | | |
| 5,748,333 A | 5/1998 | Yoshida | | |
| 5,909,602 A * | 6/1999 | Nakai et al. | ............ | 399/8 |
| 5,931,905 A * | 8/1999 | Hashimoto et al. | ............ | 709/217 |
| 5,963,340 A * | 10/1999 | Kim | ............ | 358/440 |
| 6,023,723 A * | 2/2000 | McCormick et al. | ............ | 709/206 |
| 6,057,942 A * | 5/2000 | Sato | ............ | 358/435 |
| 6,122,657 A * | 9/2000 | Hoffman et al. | ............ | 709/201 |
| 6,199,102 B1 * | 3/2001 | Cobb | ............ | 709/206 |
| 6,239,881 B1 * | 5/2001 | Shaffer et al. | ............ | 358/440 |
| 6,366,950 B1 * | 4/2002 | Scheussler et al. | ............ | 709/206 |

(Continued)

Primary Examiner—Twyler L. Haskins
Assistant Examiner—Jonathan R Beckley
(74) Attorney, Agent, or Firm—Wenjie Li; Hoffman Warnick LLC (57) ABSTRACT

A method, system and program product for comparing a junk fax image stored in a database to an incoming facsimile image to determine whether the incoming facsimile image is a junk fax. If the facsimile image is a junk fax, the image is either deleted or the communication terminated. The invention also provides a junk fax determinator by which an incoming facsimile image can be designated as a junk fax. In one embodiment, a recipient (user) can make the determination as to whether the incoming facsimile image is a junk fax and generate a personal junk fax database. In another embodiment, the recipient (user) can scan a hard copy document to form an incoming facsimile image, which can be saved as a junk fax in a personal junk fax database.

14 Claims, 5 Drawing Sheets

U.S. PATENT DOCUMENTS

| | | | |
|---|---|---|---|
| 6,421,709 B1 * | 7/2002 | McCormick et al. | 709/206 |
| 6,449,062 B1 | 9/2002 | Endo | |
| 6,721,059 B1 * | 4/2004 | Sturgeon et al. | 358/1.15 |
| 6,760,746 B1 * | 7/2004 | Schneider | 709/203 |
| 6,769,016 B2 * | 7/2004 | Rothwell et al. | 709/206 |
| 6,772,196 B1 * | 8/2004 | Kirsch et al. | 709/206 |
| 7,181,495 B2 * | 2/2007 | Skladman et al. | 709/206 |
| 7,184,160 B2 * | 2/2007 | El-Gazzar et al. | 358/1.15 |
| 7,197,644 B2 * | 3/2007 | Brewington | 713/176 |
| 7,231,395 B2 * | 6/2007 | Fain et al. | 707/101 |
| 7,249,162 B2 * | 7/2007 | Rounthwaite et al. | 709/206 |
| 7,359,083 B2 * | 4/2008 | Salgado | 358/1.18 |
| 7,382,476 B1 * | 6/2008 | Maemura | 358/1.15 |
| 2002/0150300 A1 | 10/2002 | Lee et al. | |
| 2002/0159575 A1 * | 10/2002 | Skladman et al. | 379/93.24 |
| 2002/0171872 A1 | 11/2002 | Matsunaga | |
| 2002/0181026 A1 | 12/2002 | Idehara | |
| 2002/0191226 A1 * | 12/2002 | Huang | 358/440 |
| 2003/0179419 A1 * | 9/2003 | Abe | 358/474 |
| 2003/0195937 A1 * | 10/2003 | Kircher et al. | 709/207 |
| 2004/0027605 A1 * | 2/2004 | Martin | 358/1.15 |
| 2004/0054741 A1 * | 3/2004 | Weatherby et al. | 709/206 |
| 2004/0105689 A1 * | 6/2004 | Shimura et al. | 399/12 |
| 2004/0151377 A1 * | 8/2004 | Boose et al. | 382/193 |
| 2004/0167964 A1 * | 8/2004 | Rounthwaite et al. | 709/206 |
| 2004/0215977 A1 * | 10/2004 | Goodman et al. | 713/201 |
| 2005/0012966 A1 * | 1/2005 | Mitchell et al. | 358/440 |
| 2005/0088702 A1 * | 4/2005 | Advocate et al. | 358/400 |

* cited by examiner

FACSIMILE SYSTEM, METHOD AND PROGRAM PRODUCT WITH JUNK FAX DISPOSAL

BACKGROUND OF THE INVENTION

1. Technical Field

The present invention relates generally to facsimile communication, and more particularly to a facsimile system, method and program product with junk fax disposal.

2. Related Art

Mass marketing communications have become a ubiquitous part of modern day interactions. As is well known, most of these communications are a nuisance because they are unsolicited and unwanted. The problem is so widespread that new terms have arisen to describe these communications such as "junk mail," "spam," "junk e-mail," etc.

Regardless of the type of communication format, mass marketing communications force consumption of resources of the recipient. For example, when these communications are received via post, recipients must waste time filtering through the "junk mail" and must dispose of more paper waste. Unfortunately, mass marketers also use electronic formats as broadcast media to reach more people at lower costs. When received via telephone, a recipient wastes time by answering the phone and may experience increased telephone usage charges. The problem is so widespread relative to telephonic communications, the US government has established a federally controlled "do-not-call" list for telemarketers.

When mass marketing is received as e-mail (i.e., junk e-mail or spam), it requires recipients to maintain larger data storage than would be required if only wanted mail was received. In addition, recipients of junk e-mail also waste time determining whether e-mail is unwanted, and then deleting those that are considered spam. Alternatively, an e-mail recipient may also employ any of a variety of software packages, such as SpamKiller™ by McAfee, that filter e-mails for unwanted communications by, for example, subject, address of sender, message text, or message header. The filtering software adds expense to any computer system's operation and consumes further computer resources.

Another telecommunications device that has found increasing acceptance beyond office use as a home appliance is a facsimile machine. As a result, facsimile machines have become increasingly targets for mass marketing communications. In addition to the extra time, data storage and telephone usage charges required of a recipient, mass marketing communications received via facsimile waste a recipient's paper and ink. Unfortunately, no mechanisms currently exist to address "junk faxes" despite the fact that recipients, as with almost all forms of mass marketing communications, oftentimes repeatedly receive very similar communications.

In view of the foregoing, there is a need in the art for a facsimile system, method and program product that address the above-described problems.

SUMMARY OF THE INVENTION

The invention includes a method, system and program product for comparing a junk fax image stored in a database to an incoming facsimile image to determine whether the incoming facsimile image is a junk fax. If the facsimile image is a junk fax, the image is either deleted or the communication terminated. The invention also provides a junk fax determinator by which an incoming facsimile image can be designated as a junk fax. In one embodiment, a recipient (user) can make the determination as to whether an incoming facsimile image is a junk fax and generate a personal junk fax database. In another embodiment, the recipient (user) can scan a hard copy document to form an incoming facsimile image, which can be saved as a junk fax in a personal junk fax database.

A first aspect of the invention is directed to a method of handling a facsimile image received by a facsimile system, the method comprising the steps of: comparing a junk fax image stored in a junk fax database to an incoming facsimile image; and disposing of the incoming facsimile image in the case that the junk fax image matches at least a portion of the incoming facsimile image.

A second aspect of the invention is directed to a facsimile system comprising: a receiver configured to receive an incoming facsimile image; and a junk fax analyzer comprising: a comparator configured to compare a junk fax image to the incoming facsimile image; and a disposal configured to dispose of the incoming facsimile image in the case that the junk fax image matches at least a portion of the incoming facsimile image.

A third aspect of the invention is directed to a computer program product comprising a computer useable medium having computer readable program code embodied therein for analyzing a facsimile image on a facsimile system, the program product comprising: program code configured to compare a junk fax image stored in a junk fax database to an incoming facsimile image; and program code configured to dispose of the incoming facsimile image in the case that the junk fax image matches at least a portion of the incoming facsimile image.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

The invention includes a method, system and program product for comparing a junk fax image to an incoming facsimile image to determine whether the incoming facsimile image is a junk fax, and dispose of the facsimile image if it is a junk fax. As used herein, a "facsimile image" is image data in any electronic form of a facsimile communication, and a "junk fax" is any facsimile image that is unwanted by a recipient. A "junk fax image" is image data in any electronic form of a junk fax.

Figure 1:
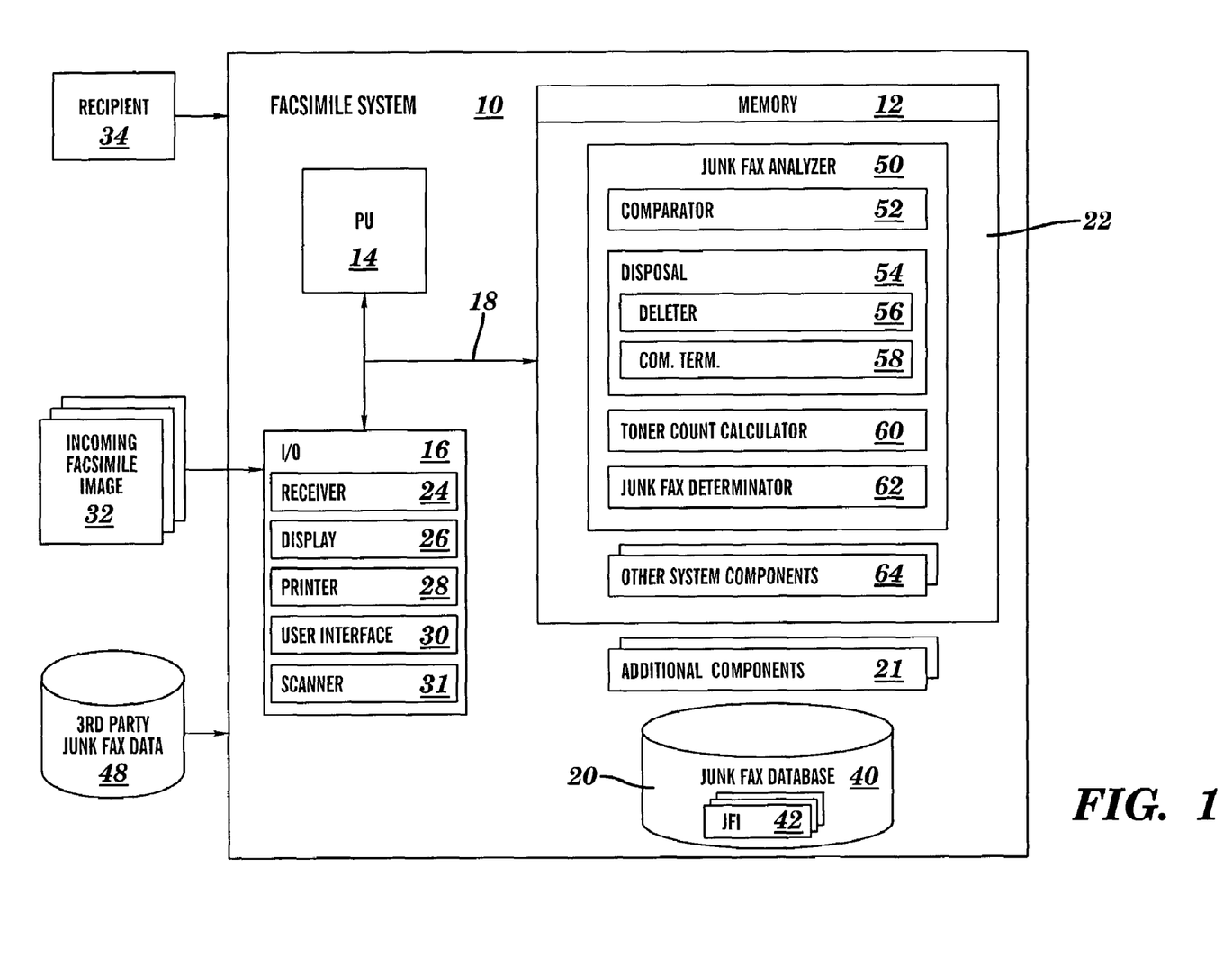
FIG. 1 shows a block diagram of a facsimile system and related environment according to the invention.

With reference to the accompanying drawings, FIG. 1 is a block diagram of a facsimile system 10 in accordance with the invention. Facsimile system 10 includes a memory 12, a processing unit (PU) 14, input/output devices (I/O) 16 and a bus 18. One or more databases 20 may also be provided for storage of data relative to processing tasks, as will be described in greater detail below. Memory 12 includes a program product 22 that, when executed by PU 14, comprises various functional capabilities described in further detail below. Memory 12 (and database 20) may comprise any known type of data storage system and/or transmission media, including magnetic media, optical media, random access memory (RAM), read only memory (ROM), a data object, etc. Moreover, memory 12 (and database 20) may reside at a single physical location comprising one or more types of data storage, or be distributed across a plurality of physical systems.

PU 14 may likewise comprise a single processing unit such as conventionally found in a stand-alone facsimile machine, or a plurality of processing units distributed across one or more locations such as a facsimile machine and personal computer combination or a facsimile machine and computer network. I/O 16 may comprise any known type of input/output device including a network system, keyboard, mouse, scanner, voice recognition system, disc drives, etc. In particular, I/O 16 may include a receiver 24, a display 26, a printer 28, a user interface 30 and a scanner 31. Receiver 24 includes any mechanism now known or later developed for receiving an incoming facsimile image 32 communication. By "incoming" is meant that the facsimile image 32 is at least partially communicated to facsimile system 10. In one example, receiver 24 may include a modem. User interface 30 may be any mechanism now known or later developed for a recipient (user) 34 to interact with facsimile system 10. For instance, user interface 30 may include key(s) or a keyboard on a facade of facsimile system 10 hardware, or may include a software interface provided on a display 26. Display 26 may be provided as an integral part of facsimile machine hardware, or may be provided on a computer system/network display coupled to facsimile system 10. Additional components 21 may also be incorporated into facsimile system 10. Additional components 21 may include, for example, hardware such as cache memory, a telephone receiver or other communication systems, facsimile machine data storage (e.g., for telephone numbers), paper feeder/storage, etc.

Figure 2:
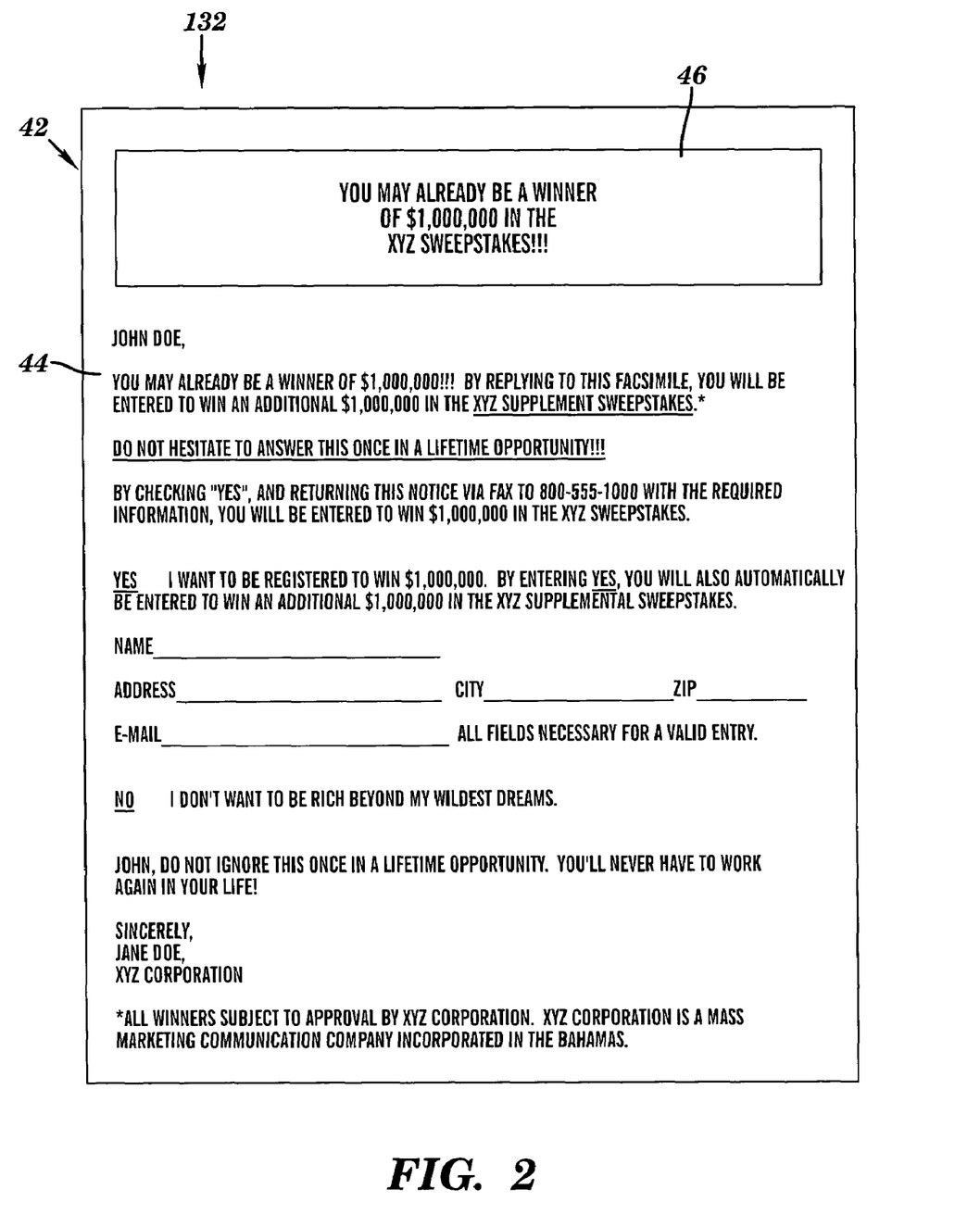
FIG. 2 shows an illustrative junk fax and junk fax image.

In this embodiment of the invention, database 20 includes, inter alia, a junk fax database 40. Junk fax database 40 includes at least one junk fax image (JFI) 42, and preferably a plurality of junk fax images 42. FIG. 2 shows an illustrative junk fax image 42 (FIG. 1). Each junk fax image 42 may include at least a portion 46 of an analyzed facsimile image 132 (not an incoming facsimile image 32) that has been designated as a junk fax 44. Portion 46 of junk fax 44, rather than the entire analyzed facsimile image 132, may be stored as a junk fax image 42 for a number of reasons. For example, storage of portion 46 reduces storage requirements and processing requirements. If portion 46 of junk fax 44 is stored, it is preferably a part of junk fax 44 that is likely to be repeated on other junk faxes. For example, a heading area may be a portion of particular series of junk faxes that is known to not change. In this case, junk fax image 42 may include the heading area only rather than the entire analyzed facsimile image 132, i.e., only portion 46 is stored as junk fax image 42. As will be described further below, this procedure allows for comparison of junk fax image(s) 42 to an incoming facsimile image 32 (FIG. 1), or a portion thereof, to determine whether incoming facsimile image 32 is a junk fax.

Junk fax database 40 may be populated, as will be described further below, by a recipient 34 designating incoming facsimile image(s) 32 as a junk fax. Alternatively, junk fax database 40 may be populated by junk fax data 48 (FIG. 1) as provided by a third party. In this fashion, junk fax image(s) 42 may be collected and distributed so each facsimile system 10 is provided with a starting point. After third party junk fax data 48 is implemented, additional junk fax image(s) 42 may be added, as will be described below.

Returning to FIG. 1, according to the invention, program product 22 includes a junk fax analyzer 50 for analyzing and disposing of a facsimile image 32 that is considered a junk fax. Junk fax analyzer 50 includes a comparator 52 and a disposal 54. Junk fax analyzer 50 may also include a toner count calculator 60 and a junk fax determinator 62. Disposal 54 may include a deleter 56 and/or a communication terminator 58. Other system components 64 may provide any other facsimile system 10 function now known or later developed, e.g., re-transmission, broadcasting, storage, computer-based analysis, etc. Functionality of the above components will become apparent from the description of methodology that follows.

Figure 3:
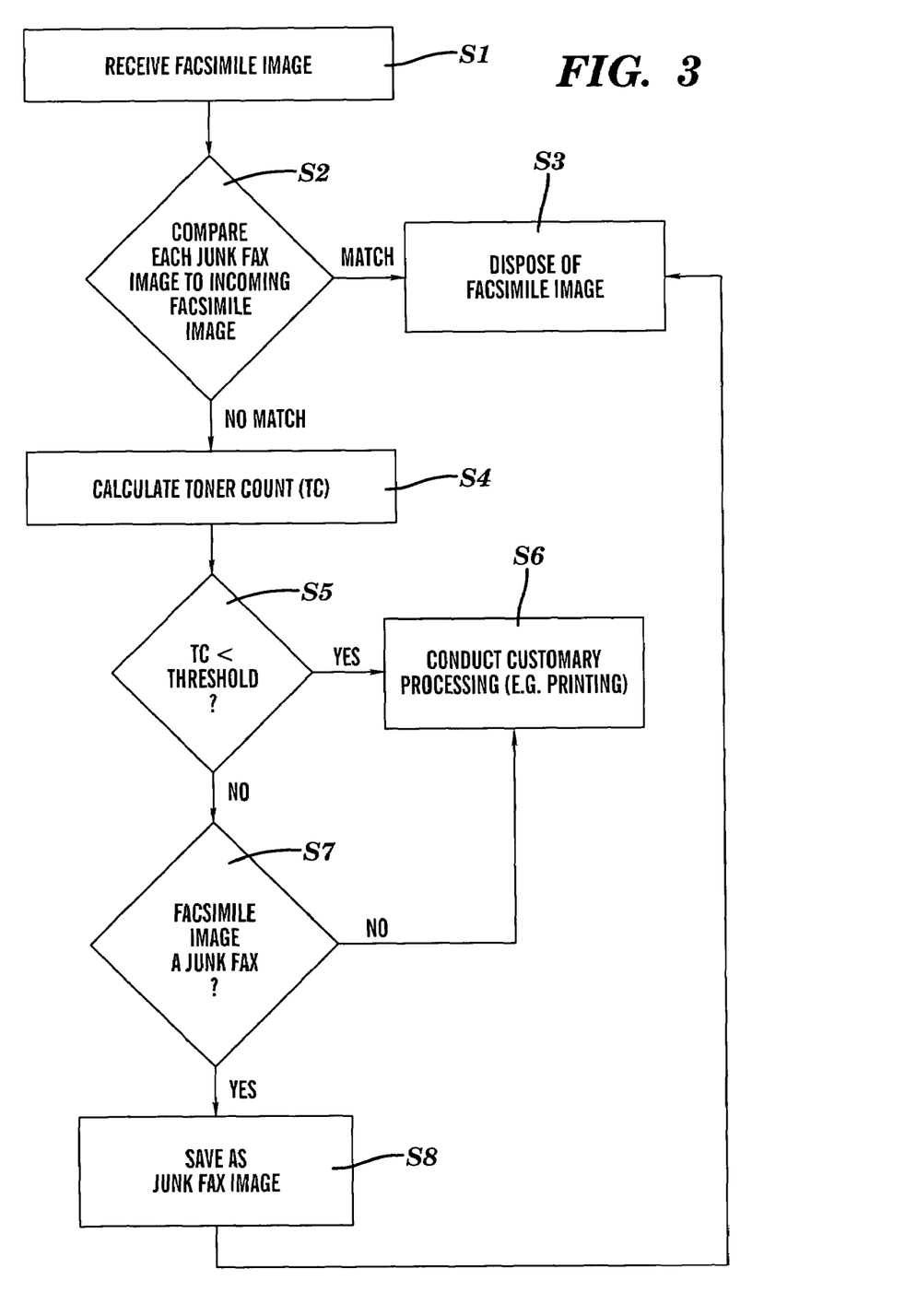
FIG. 3 shows a flow diagram of a method of operation of the system of FIG. 1.
Figure 4:
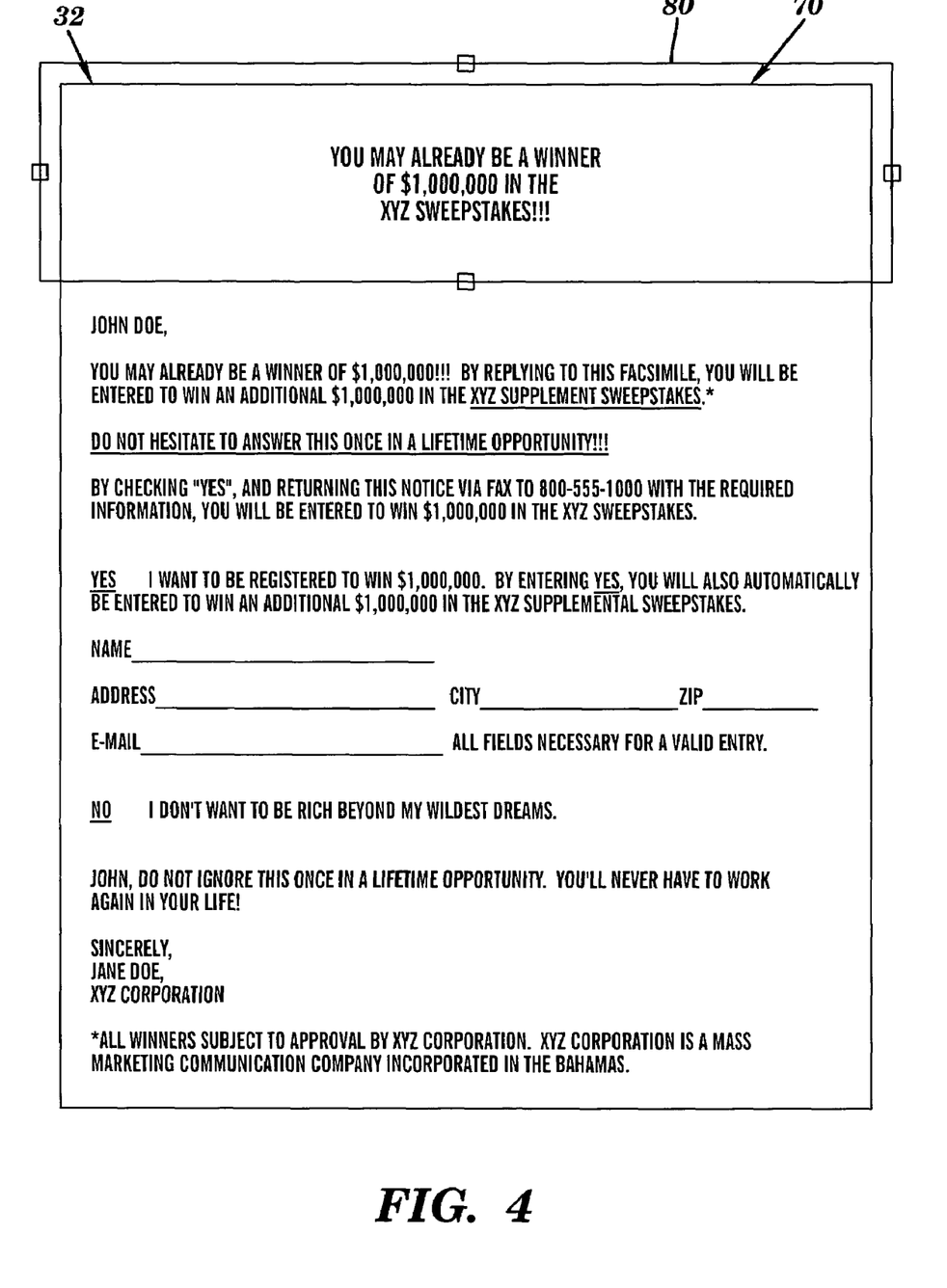
FIG. 4 shows an illustrative incoming facsimile image.

Turning to FIGS. 1, 3 and 4, operation of the above-described facsimile system 10 will now be described. With reference to the flow diagram of FIG. 3, as a preliminary step S1, an incoming facsimile image 32 (FIG. 1) is communicated to the facsimile system 10 (FIG. 1) and at least partially received by receiver 24 (FIG. 1). An illustrative incoming facsimile image 32 is shown in FIG. 4. It should be recognized that incoming facsimile image 32 has been shown to be substantially similar to junk fax 44 (FIG. 2) for purposes of description only. The following functions can be conducted as incoming facsimile image 32 is being received by receiver 24, or may be conducted once incoming facsimile image 32 is saved in memory 12 of facsimile system 10.

In step S2, each junk fax image 42 (FIGS. 1 and 2) is compared by comparator 52 to incoming facsimile image 32 (FIG. 4) to determine whether incoming facsimile image 32 is considered a junk fax. As described above, each junk fax image 42 (FIGS. 1 and 2) may include portion 46 (FIG. 2) of an analyzed facsimile image 132 or an entire facsimile image 132. If junk fax image 42 includes portion 46 of analyzed facsimile image 132, then the portion is preferably selected to correspond to similar data, e.g., a heading, a logo, etc., that may be unique for a particular junk fax. In addition, if junk fax image 42 is a portion 46 (FIG. 2) of analyzed facsimile image 132, then comparison of each junk fax image 42 may occur against a similar area of incoming facsimile image 32 (FIG. 4) from which portion 46 was taken from analyzed facsimile image 132. Alternatively, where junk fax image 42 is a portion 46, comparison may be conducted across the entirety of incoming facsimile image 32 (FIG. 4) to assure that portion 46 has not simply been moved to another area of incoming facsimile image 32.

In the case that at least one junk fax image 42 matches at least a portion of incoming facsimile image 32, then incoming facsimile image 32 is considered a junk fax. In this case, at step S3, incoming facsimile image 32 is disposed of by disposal 54. Disposal of incoming facsimile image 32 may occur in one of two ways. First, deleter 56 may delete incoming facsimile image 32 from memory 12. Second, a communication terminator 58 may terminate communication of incoming facsimile image 32 as the image is received by receiver 54, e.g., terminator 58 may signal receiver 24 to terminate communication. This latter option allows for immediate release of facsimile system 10 resources.

In the case that a match does not exist, then incoming facsimile image 32 is not immediately considered a junk fax 44. Steps S4-S5 represent alternative steps. In step S4, a toner count of at least a portion of incoming facsimile image 32 (FIG. 4) is calculated using toner count calculator 60. Toner count calculator 60 may include any now known or later developed mechanism for determining a toner count of facsimile image 32. In step S5 (FIG. 3), comparator 52 determines whether the toner count (TC) is below a threshold that is user-defined, e.g., 30% greater than a typical text only page.

In the case that the toner count is below the threshold, at step S6, customary processing is conducted. The function of steps S4-S6 may be provided to address the situation where incoming facsimile image 32 uses such a small amount of resources that conducting customary processing is not a significant burden. "Customary processing" may include any other data processing now known or later developed for incoming facsimile image 32. For example, incoming facsimile image 32 may be stored, printed, have optical character recognition and/or magnetic character recognition conducted, or other processing.

At step S7, if steps S4-S6 are not provided or the toner count exceeds the threshold, a determination as to whether incoming facsimile image 32 is a junk fax is conducted by junk fax determinator 62. In one embodiment, junk fax determinator 62 displays at least a portion of incoming facsimile image 32 to a recipient 34 (FIG. 1) via display 26, and allows recipient 34 to select, e.g., via user interface 30, whether incoming facsimile image 32 is a junk fax, i.e., whether it or further faxes like it are wanted. User interface 30 may be provided in a number of fashions depending on the invention's implementation. For example, user interface 30 may be a simple query on a small facsimile machine display 26 with a response entered by keying. Alternatively, user interface 30 may be provided as a more interactive display 26 on a computer system that is coupled to a facsimile machine with a response entered by keying, mouse selection, voice direction, etc. If it is determined that incoming facsimile image 32 is not a junk fax, then customary processing of incoming facsimile image 32 is conducted at step S6, e.g., it is stored, printed, has optical character recognition and/or magnetic character recognition conducted, or other processing.

If it is determined that incoming facsimile image 32 is a junk fax, then at step S8, at least a portion of incoming facsimile image 32 is stored as a junk fax image 42 (FIGS. 1 and 2). In this case, where user interface 30 is provided on a large display 26 and a number of input devices such as keyboard and mouse are provided, a selector 80 (FIG. 4) such as those commonly used to crop such things as text or pictures may be provided. In this fashion, a portion 70 of incoming facsimile image 32 can be selected and saved as a junk fax image 42 (FIG. 2). Where user interface 30 is not provided on a large display 26, queries may be presented to recipient 34 for generation of junk fax image 42. For example, queries may provide for selection of such things as junk fax image 42 dimensions, orientation, etc., to be gathered from incoming facsimile image 32.

In another embodiment, junk fax determinator 62 may be implemented to automatically analyze incoming facsimile image 32 to determine whether it is a junk fax 44. For example, junk fax determinator 62 may be implemented to conduct optical character recognition on incoming facsimile image 32, and then search for keywords that may denote incoming facsimile image 32 as a junk fax. In this case, keywords may be selected by recipient 34. The junk fax determination can occur in a number of ways, as will be appreciated by those skilled in the art.

Figure 5:
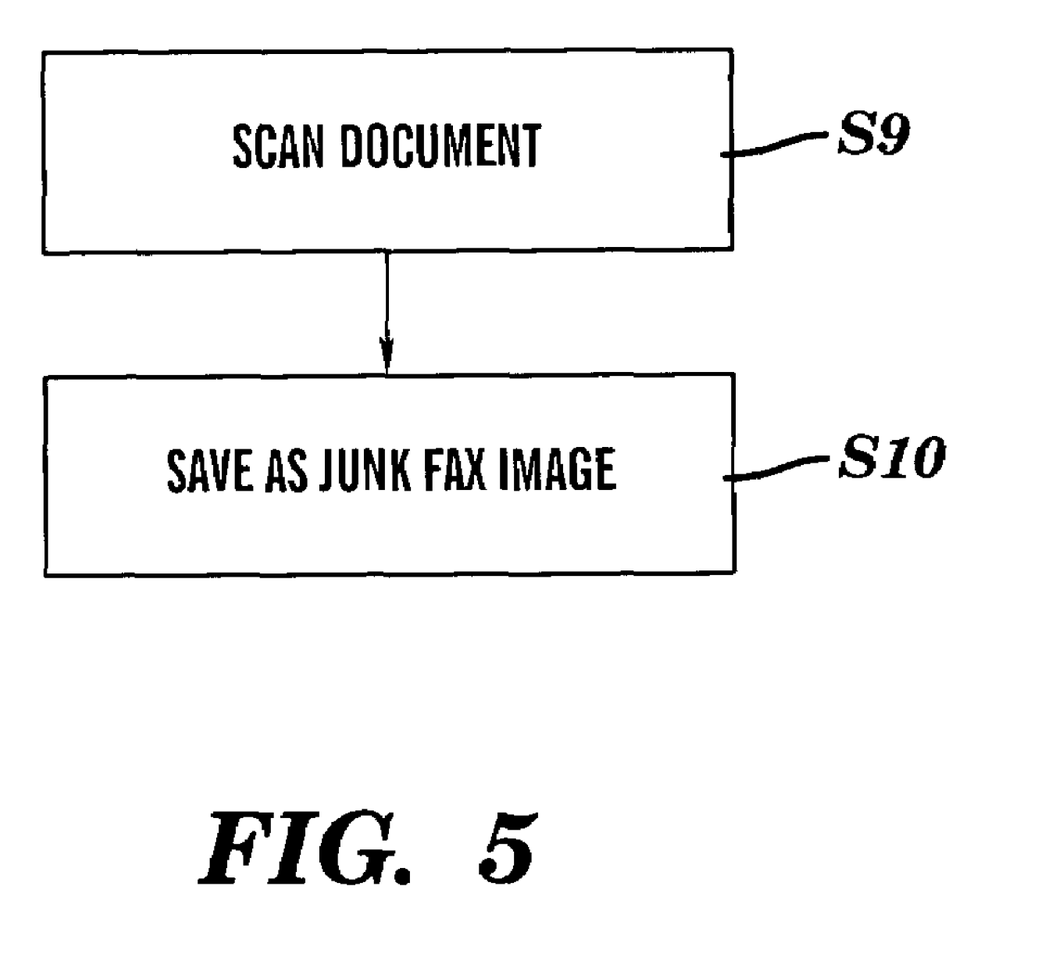
FIG. 5 shows a flow diagram of an alternative method for the system of FIG. 1.

Turning to FIG. 5, an alternative method for use with facsimile system 10 is illustrated. This method is applicable where a hard copy document is in the possession of recipient 34, and is considered by the recipient to represent a junk fax 44 or the basis for a junk fax. The hard copy document may resemble, for example, incoming facsimile image 32 (FIG. 4) or any other document. The hard copy document may be in the recipient's possession because it passed through the above-described processing undetected (e.g., because it was not detected as a junk fax in step S2 (FIG. 3) and did not exceed a toner count threshold at step S5, and was printed at step S6), or is otherwise obtained by the recipient. In this case, in step S9, recipient 34 may scan the hard copy document via scanner 31 (FIG. 1) to generate an image to be treated as incoming facsimile image. Note, however, that scanning would only be necessary, in the case of an undetected and printed junk fax, if the image was not retained. Next, at step S10, recipient 34 may add the image to junk fax database 40 (FIG. 1) as a junk fax image 42 as described-above relative to steps S7-S8 of FIG. 3 via junk fax determinator 62. In this fashion, practically any document that does not come to facsimile system 10 in electronic form that is considered a junk fax may be added to junk fax database 40.

It should be recognized that the above-described facsimile system 10 may be provided in a number of fashions. As illustrated in the FIG. 1 embodiment, facsimile system 10 is shown as an integrated system, e.g., a facsimile machine including junk fax analyzer 50 and a display 26 capable of providing sufficient space to view a portion of incoming facsimile image 32. In another embodiment, facsimile system 10 may be provided as facsimile software on a personal computer. In yet another embodiment, facsimile system 10 may be provided with a combination of facsimile machine hardware and software. For example, a facsimile machine may be provided to interact with a junk fax analyzer 50 that is provided as software on a personal computer. In view of the foregoing, the invention should not be limited to any particular implementation.

In the previous discussion, it will be understood that the method steps discussed are performed by a processor, such as PU 14 of system 10, executing instructions of program product 22 stored in memory. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of handling a facsimile image received by a facsimile system, the method comprising the steps of:

comparing a junk fax image stored in a junk fax database to an incoming facsimile image, wherein the junk fax image includes at least a portion of an analyzed facsimile image distinct from the incoming facsimile image and likely to appear in another incoming facsimile image, and wherein the comparing includes using at least one of optical character recognition or magnetic character recognition to determine whether the junk fax image matches at least a portion of the incoming facsimile image;

disposing of the incoming facsimile image in the case that the junk fax image matches at least a portion of the incoming facsimile image;

wherein if a match does not exist, the method further comprises:

determining whether the incoming facsimile is of a junk fax by displaying at least a portion of the incoming facsimile image before outputting the image, wherein the outputting includes printing the incoming facsimile image through the facsimile system;

allowing a recipient to view the at least a portion of the displayed image to determine whether the incoming facsimile image is of a junk fax;

saving at least a portion of the incoming facsimile image as a junk fax image in the junk fax database in the case that the incoming facsimile image is of a junk fax;

calculating a toner count of at least a portion of the incoming facsimile image; and processing the incoming facsimile image in the case that the toner count is below a threshold.

2. The method of claim 1, wherein the junk fax image database includes a plurality of junk fax images, and the step of disposing occurs in the case that at least one of the plurality of junk fax images matches at least a portion of the incoming facsimile image.

3. The method of claim 1, wherein the disposing step includes one of:

a) deleting the incoming facsimile image; and
b) terminating communication of the incoming facsimile image to the facsimile system.

4. The method of claim 1, wherein the incoming facsimile image is generated by scanning a hard copy document, and wherein the junk fax image is generated by scanning a hard copy of a different document.

5. The method of claim 1, wherein the portion of the analyzed facsimile image likely to appear in another incoming facsimile image is a heading area of a series of junk faxes that is known not to change.

6. A facsimile system comprising:

a receiver configured to receive an incoming facsimile image; and a junk fax analyzer comprising:

a comparator configured to compare a junk fax image to the incoming facsimile image, wherein the junk fax image includes at least a portion of an analyzed facsimile image distinct from the incoming facsimile image and likely to appear in another incoming facsimile image, and wherein the comparing includes using at least one of optical character recognition or magnetic character recognition to determine whether the junk fax image matches at least a portion of the incoming facsimile image;

a disposal configured to dispose of the incoming facsimile image in the case that the junk fax image matches at least a portion of the incoming facsimile image; and a junk fax determinator configured to determine whether the incoming facsimile image is a junk fax, and save at least a portion of the incoming facsimile image as a junk fax image in a junk fax database in the case that the incoming facsimile image is a junk fax;

wherein the junk fax determinator includes:

a display configured to display at least a portion of the incoming facsimile image before the image is outputted; wherein the outputting includes printing the incoming facsimile image through the facsimile system;

an interface configured to allow a recipient to view the at least a portion of the displayed image to input whether the incoming facsimile image is a junk fax; and a selector configured to allow the recipient to select at least a portion of the incoming facsimile image to be saved as the junk fax image.

7. The system of claim 6, wherein the junk fax analyzer farther comprises a toner count calculator configured to calculate a toner count of at least a portion of the incoming facsimile image.

8. The system of claim 6, wherein the junk fax image includes at least a portion of one of: an analyzed facsimile image from a previous communication to the facsimile system and an image of a hard copy document.

9. The system of claim 6, wherein the junk fax image includes a plurality of junk fax images, and the step of disposing occurs in the case that at least one of the plurality of junk fax images matches at least a portion of the incoming facsimile image.

10. The system of claim 6, wherein the disposal includes:

a) a component for deleting the incoming facsimile image; and
b) a component for terminating communication of the incoming facsimile image to the facsimile system.

11. The system of claim 6, wherein the portion of the analyzed facsimile image likely to appear in another incoming facsimile image is a heading area of a series of junk faxes that is known not to change.

12. A computer program product comprising a computer useable medium having computer readable program code embodied therein for analyzing an image on a facsimile system, the program product comprising:

program code configured to compare a junk fax image stored in a junk fax database to an incoming facsimile image, wherein the junk fax image includes at least a portion of an analyzed facsimile image distinct from the incoming facsimile image and likely to appear in another incoming facsimile image, and wherein the comparing includes using at least one of optical character recognition or magnetic character recognition to determine whether the junk fax image matches at least a portion of the incoming facsimile image;

program code configured to dispose of the incoming facsimile image in the case that the junk fax image matches at least a portion of the incoming facsimile image; and program code configured to determine whether the incoming facsimile image is of a junk fax in the case that a match does not exist, and save at least a portion of the incoming facsimile image as a junk fax image in a junk fax database in the case that the incoming facsimile image is of a junk fax;

wherein the determining program code includes:

program code configured to display at least a portion of the incoming facsimile image before the image is outputted; wherein the outputting includes printing the incoming facsimile image through the facsimile system; and program code configured to allow a recipient to view the at least a portion of the displayed image to input whether the incoming facsimile image is a junk fax.

13. The program product of claim 12, wherein the disposing program code includes program code configured to conduct one of:

a) delete the incoming facsimile image; and b) terminate communication of the incoming facsimile image to the facsimile system.

14. The computer program product of claim 12, wherein the portion of the analyzed facsimile image likely to appear in another incoming facsimile image is a heading area of a series of junk faxes that is known not to change.

* * * * *